United States Patent [19]
Okada et al.

[11] 3,746,965
[45] July 17, 1973

[54] DIRECT CURRENT ARC WELDER

[75] Inventors: Toshiyuki Okada, Sumiyoshi-ku; Osaka-shi; Muritoshi Nagasaka, Nishinari-ku, Osaka-shi, both of, Japan

[73] Assignee: Osaka Transformer Co., Ltd., Osaka-shi, Osaka-fu, Japan

[22] Filed: Aug. 31, 1971

[21] Appl. No.: 176,613

[30] Foreign Application Priority Data
Aug. 31, 1970 Japan.............................. 45/75631

[52] U.S. Cl. .................. 321/5, 219/131 WR, 321/18
[51] Int. Cl. ........................................... H02m 7/20
[58] Field of Search................. 219/131 R, 131 WR; 321/5, 18; 323/DIG. 1

[56] References Cited
UNITED STATES PATENTS

| | | | |
|---|---|---|---|
| 3,483,464 | 12/1969 | Embree et al. ................ | 323/DIG. 1 |
| 3,351,838 | 11/1967 | Hunter................................... | 321/5 |
| 3,368,139 | 2/1968 | Wuerflein....................... | 323/DIG. 1 |
| 3,437,912 | 4/1969 | Morris............................ | 323/DIG. 1 |
| 3,614,377 | 10/1971 | Stearns et al. ................... | 219/131 R |

Primary Examiner—William M. Shoop, Jr.
Attorney—Craig, Antonelli & Hill

[57] ABSTRACT

In a direct current arc welder comprising a phase control circuit for controlling the triggering phase of at least one controlled rectifier element to convert alternating current into direct current which is in turn supplied to a welding electrode and a workpiece to be welded and a feedback circuit for negative-feeding a portion of the direct current thus converted back to the phase control circuit thereby to control the welder output, a gain compensating circuit for compensating the gain of a control circuit in response to the value of said direct current output of the welder to maintain said gain at a substantially constant value no matter what level the value of said direct current output may be.

9 Claims, 10 Drawing Figures

DIRECT CURRENT ARC WELDER

The present invention relates to a direct current arc welder of the type comprising an electronic controlled rectifier element and a trigger control circuit for controlling the electronic controlled rectifier element thereby to control the phase of an alternating current input and concurrently to rectify the alternating current input to yield a direct current output and, more particularly, to an improvement in a trigger control circuit wherein a portion of the direct current output is fed back to the trigger control circuit for maintaining the direct current output at a constant value which corresponds to a predetermined value of the direct current output of the arc welder.

In an exemplary type of conventional DC arc welder wherein an AC input is rectified to yield an DC output, there has been proposed the provision of a combination of an electronic controlled rectifier element, such as comprising a thyristor or the like, and a trigger control circuit for controlling the electronic controlled rectifier element, whereby the phase of the AC input is controlled so that the DC output of the arc welder can be maintained at a constant value. In this instance, an additional provision has been necessitated for avoiding the fluctuation of the DC output which may result from variations in the AC input voltage supplied to the arc welder and/or in the load imposed on the arc welder. To avoid the fluctuation of the resultant DC output of the arc welder, it has been one practice to feed a portion of the DC output of the arc welder back to the trigger control circuit, so that the difference between the voltage of the DC output, which has been fed back to such a trigger control circuit, and the voltage of an input that has been applied to such trigger control circuit to obtain a DC output of the predetermined value from the arc welder can be detected to enable the controlled rectifier element to be controlled in response to a signal representative of such difference.

In general, it has been well recognized that a power source for an arc welder of drooping characteristic should be effective to supply a current of steady value, namely, the power source should have a constant current characteristic in which the value of current undergoes no fluctuation even when the arc length varies, as well as a favorable transient characteristic. This is because, in view of the fact that a regular alternation of shortcircuiting and arcing takes place repeatedly in a rapid sequence and thus the power source has a tendency to receive a varying load, the arc welder must be operated steadily despite of this varying load imposed thereon.

Figure 1:
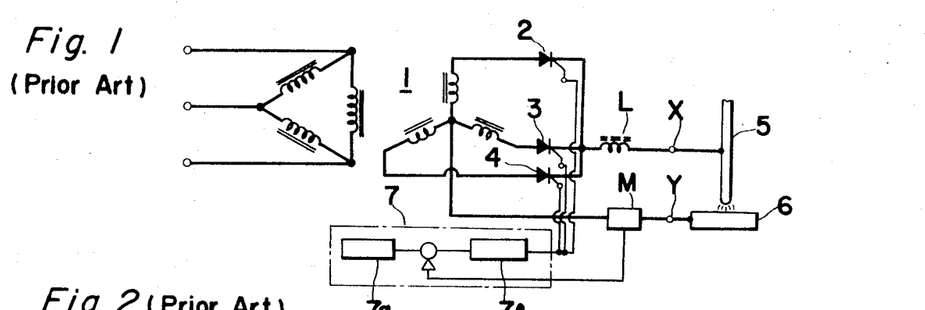
FIG. 1 is a schematic block diagram of the conventional DC arc welder of the type above referred to, FIG. 2 is a detailed wiring diagram of the arc welder as shown in FIG. 1.

To clarify the background of the present invention, the conventional DC arc welder of the type above referred to will be hereinafter fully discussed with reference to some of the attached drawings which are respectively labeled "Prior Art" and wherein;

Referring to FIG. 1, the conventional DC arc welder generally comprises a three phase transformer 1, three thyristors 2, 3 and 4, the anodes of which are respectively connected with phase output terminals of the secondary windings of said transformer 1 while the cathodes are connected to each other, and a choke coil L having one end connected with the common junction of said cathodes of said thyristors and the other end connected with a welding electrode 5 through an output terminal X of the welder, the neutral terminal of said secondary windings of said transformer being connected with a workpiece 6 to be welded through another output terminal Y of the welder via a magnetic amplifier M. This arc welder further comprises a trigger control circuit 7 including a preset circuit 7a for presetting the output of the welder at a desired value and a control signal generator 7b operable in response to an output signal from said preset circuit 7a to feed a trigger signal to the thyristors 2, 3 and 4 through the respective gates thereof so that said thyristors can be triggered on.

As described above, in the arrangement as shown, the provision of such means as the magnetic amplifier M or a current transformer has been made on the connection between the neutral terminal of the secondary winding of the transformer 1 and the output terminal Y of the welder whereby a portion of the output of the arc welder can be negatively fed back to an input terminal of the control signal generator 7b to avoid the possible fluctuation of the output of the arc welder.

Figure 2:
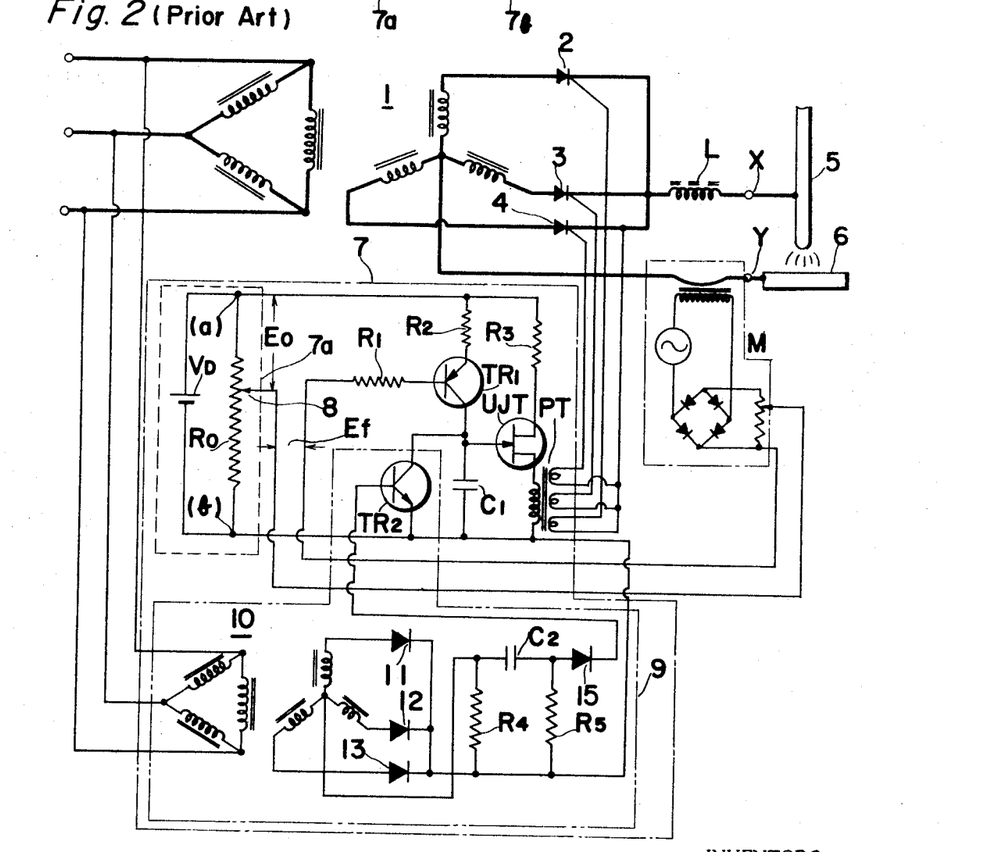

The details of the block diagram of FIG. 1 are such as shown in FIG. 2 wherein the area encircled by the chain line at FIG. 1 represents the trigger control circuit 7 which includes the preset circuit 7a and the control signal generator 7b.

Referring now to FIG. 2, the preset circuit 7a includes a DC power source $V_D$ and a resistor Ro connected in parallel to said power source $V_D$, said resistor Ro being so variable that the output voltage of the arc welder can be determined by the voltage drop of the value Eo between one end of said resistor Ro which has been connected with the positive terminal of the DC power source $V_D$ at a junction $(a)$ and the slider 8.

The signal representative of voltage Ef that has been negatively fed back and that has been proportional to the output of the arc welder can be compared with the voltage Eo to give a signal representative of the difference between the voltages Eo and Ef. This difference signal is in turn applied to the base of a PNP amplifier transistor TRI through a Resistor $R_1$. The emitter of said amplifier transistor TRI is connected with the positive terminal of the DC power source $V_D$ through a resistor $R_2$ while the collector thereof is connected with the negative terminal of the DC power source $V_D$ through the parallel circuit which comprises a condenser $C_1$ and an output switching transistor $TR_2$ of the synchronizing circuit 9 as will be mentioned later. The collector of said amplifier transistor TRI is also connected with the emitter of a uni-junction transistor UJT. Between a first base of said uni-junction transistor UJT and the negative terminal of the power source $V_D$ and between a second base of said uni-junction transistor UJT and the positive terminal of said power source $V_D$, a pulse transformer PT and a resistor $R_3$ are respectively connected.

The synchronizing circuit 9 has been designed such that the condenser $C_1$ can begin to change at the intersection points of the phase voltages generated by the three phase transformer 1, and includes three rectifier elements 11, 12 and 13, respectively connected with secondary windings of a three phase transformer 10, which has been disposed in parallel relation to the three phase transformer 1, for rectifying the voltages generated by said transformer 10 and a resistor $R_4$ connected between a neutral terminal of said secondary windings of said transformer 10 and a common junction $(c)$ at which the cathodes of said rectifier elements 11, 12, and 13 are connected to each other. In this arrangement, although the voltage between the both ends of the resistor $R_4$ is in synchronism with the output voltage of the transformer 1, the polarity thereof at one end of said resistor $R_4$ connected with the neutral terminal of the transformer 10 is negative while that at the other end of said resistor $R_4$ connected with the common junction $(c)$ is positive. A DC component of this voltage between the both ends of said resistor $R_4$ can be cut off by a condenser $C_2$ and, therefore, only the AC component thereof can be impressed on the both ends of a resistor $R_5$. The voltage between the both ends of said resistor $R_5$ is in turn supplied through a rectifier element 15 between the base and emitter of the switching transistor TR2 disposed in parallel relation to the condenser $C_1$, whereby the switching transistor $TR_2$ can be triggered on during a short period of time at the time corresponding to the intersection points of each phase voltage of the output of the arc welder to cause the condenser $C_1$ to be instantaneously discharged.

From the foregoing, it will be clearly understood that trigger signals to be respectively applied to the thyristors 2, 3 and 4 for switching the latter on can be obtained from output windings of the pulse transformer PT in synchronism with each phase of the three phase AC current and concurrently in relation to the output signal that has been supplied from the preset circuit 7a to the control circuit 7b.

However, in the conventional DC arc welder having the circuitry of the construction above referred to, there has been found a disadvantage in that the stability of the welder output varies depending upon the phase at which the thyristors are triggered on, namely upon the magnitude of the phase control angle. Because of this disadvantage inherent to the conventional DC arc welder, the welder output cannot be stably maintained during the arc welding operation irrespective of a varying magnitude of the phase control angle.

Figure 3:
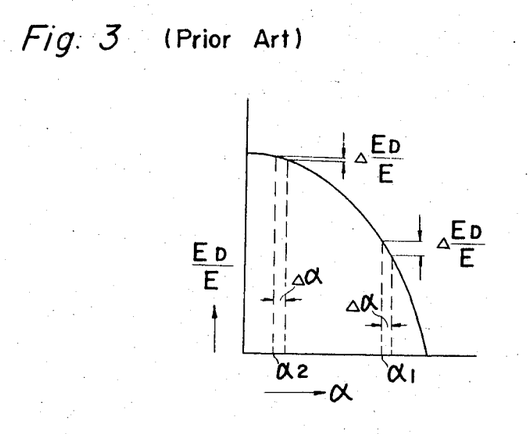
FIG. 3 is a performance curve of the ratio of mean voltage to phase voltage of the DC output voltage relative to the phase control angle of the arc welder shown in FIG. 1.
Figure 8:
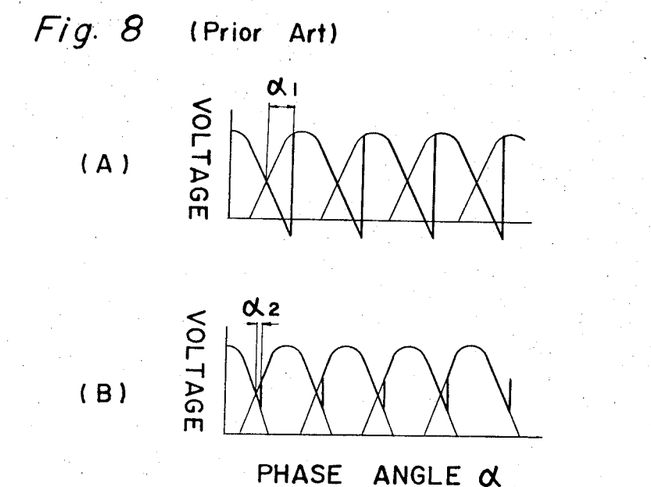
FIG. 8 shows schematic diagrams showing the waveforms of the DC arc welder corresponding to FIG. 2.

The reason for the above disadvantage will be hereinafter fully discussed in connection with the circuitry shown in FIG. 2. In this circuitry, if the inductance of the choke coil L is of a relatively large value, then the mean voltage $E_D$ of the welder output can be given by the following equation:

$$E_D = \frac{1}{\frac{2}{3}\pi} \int_{\pi/6 + \alpha}^{5/6\pi + \alpha} \sqrt{2}E \cdot \sin\theta \cdot d\theta = \frac{\sqrt{2} \times \sqrt{3}}{\frac{2}{3}\pi}$$

$$E \cdot \cos\alpha = \frac{3\sqrt{6}}{2\pi} E \cdot \cos\alpha = 1.17 E \cdot \cos\alpha \quad (1)$$

wherein E is a phase voltage of the three phase transformer 1 and $\alpha$ is the phase control angle of each thyristor. If the values of the phase control angle $\alpha$ and $E_{D/E}$ are drawn in the axes of abscissa and ordinate, respectively, a curve such as shown in FIG. 3 can be given. In FIG. 3, the relationship between $E_{D/E}$ obtainable when the phase control angle $\alpha$ is of a relatively larger value $\alpha_1$ as shown in FIG. 8 (A) and that obtainable when the angle $\alpha$ is of a relatively smaller value $\alpha_2$ as shown in FIG. 8 (B) is such that, if the both values $\alpha_1$ and $\alpha_2$ are equally varied a value $\alpha$ as shown, the former is greater than the latter. Thus:

$$\left[\Delta\frac{E_D}{E}\atop \Delta\alpha\right]_{\alpha=\alpha_1} > \left[\Delta\frac{E_D}{E}\atop \Delta\alpha\right]_{\alpha=\alpha_2} \quad (2)$$

Attention is now directed to the stability of the gain of the circuitry shown in FIG. 2. In view of the fact that the circuit consisting of a pulse generator, which comprises the amplifying transistor TRI, the uni-junction transistor UJT and the pulse transformer PT, and the magnetic amplifier M is of the linear circuit type, the circuit has a constant gain irrespective of the magnitude of inputs respectively applied thereto. On the contrary, despite the foregoing, the gain of the phase controlled rectifier circuitry, shown in FIG. 2 is subject to variation dependent upon the phase control angle $\alpha$. In other words, since the mean voltage $E_D$ and the relationship between the amplification factors with respect to the respective phase control angles $\alpha_1$ and $\alpha_2$ are such as herein-before described, the relationship between the gains $\Delta E_D/\Delta\alpha$ with respect to the values $\alpha_1$ and $\alpha_2$ of the phase control angle $\alpha$ is such as follows:

$$\left[\Delta\frac{E_D}{E}\atop \Delta\alpha\right]_{\alpha=\alpha_1} \times E \therefore \left[\Delta\frac{E_D}{E}\atop \Delta\alpha\right]_{\alpha=\alpha_2} \times E$$

$$\therefore \left[\frac{\Delta E_D}{\Delta\alpha}\right]_{\alpha=\alpha_1} \therefore \left[\frac{\Delta E_D}{\Delta\alpha}\right]_{\alpha=\alpha_2} \quad (3)$$

Accordingly, it is clear that the gain $\Delta E_D/\Delta\alpha$ the phase controlled rectifier circuitry of FIG. 2 increases in proportion to the phase control angle $\alpha$. However, it is to be noted that, although the gain of the rectifier circuitry is essentially expressed in terms of output voltage/input voltage, for the sake of convenience, $\Delta E_D/\Delta\alpha$ is herein employed to designate it.

It is also to be noted that, since the gain of the circuit other than the rectifier circuitry is always constant as hereinbefore described, variation in the gain of the welder output control system may be considered as variation in the gain of the rectifier circuitry. In other words, the gain of this rectifier circuitry can be considered as the gain of the closed loop control system of the welder having a feedback circuit.

According to the theory of automatic control set forth in "Analysis of Feedback Control Systems," McGraw-Hill Book Co., 1955, it has been well known that, in a phase control circuit having a feed back system, whether or not the feed back system is stable can be determined by the gain characteristic of the transfer function thereof. In other words, it is true, that, if the gain becomes excessive with respect to a certain value of the phase control angle, the feed back system naturally becomes unstable.

In view of the above theory of automatic control which may apply to the circuit arrangement of the conventional DC arc welder of the type referred to, if the DC arc welder wherein the transfer function of the phase controlled rectifier circuitry has been adjusted so that a proper gain can be obtained under the condition that the value of the phase control angle $\alpha$ is small, namely, the output current is relatively higher, is operated under the condition that the phase control angle $\alpha$ is large, the gain of the phase controlled rectifier circuitry will become excessive and the oscillating or hunting will occur to an extent that the stability thereof may be broken. On the contrary, if the DC arc welder wherein the transfer function of the phase controlled rectifier circuit has been adjusted so that a proper gain can be obtained under the condition that the value of the phase control angle $\alpha$ is large, namely, the output current is of a relatively lower, is operated under the condition that the phase control angle $\alpha$ is small, the gain of the phase controlled rectifier circuitry will decrease and the control sensitivity will be badly affected.

In order to prevent the gain from excessively increasing which will cause the oscillating or hunting, various methods have been heretofore proposed such as to reduce the gain of the phase controlled rectifier circuitry, increase the inductance of the choke coil L, or to insert in the phase controlled rectifier circuitry a filter circuit having a time delay. However, none of these proposed methods can be recommended in view of the fact that, according to the first mentioned method, the control sensitivity is nevertheless lowered with the result of an unfavorable increase of the regulation and that, according to the remaining two methods, the transient characteristic of the welder is badly affected.

Thus, it has been well recognized that, in the conventional DC arc welder, the gain of the phase controlled circuitry varies depending upon the value of the output current of the welder and, accordingly, a stable control cannot be obtained irrespective of the value of the output current thereof.

Accordingly, an essential object of the present invention is to provide an improved DC arc welder designed so as to eliminate the above mentioned disadvantages heretofore inherent to the conventional welder of the type above referred to.

Another object of the present invention is an improved DC arc welder having a control circuit wherein a gain compensating circuit is provided for increasing the gain of the control circuit when the output current is of a relatively greater value and to decrease it when it is of a relatively smaller value, whereby the gain of a control system including the control circuit and a rectifier circuit controllable by said control circuit can be maintained at a substantially constant value no matter what the value of the output current or the phase control angle may be.

A further object of the present invention is to provide an improved DC arc welder which can be stably controlled throughout the welding operation no matter what the value of the output current, i.e., the phase control angle may be, with the result that a favorable transient characteristic can be exhibited with substantial reduction of the regulation of the welder output.

According to the present invention, since the control circuit of the DC arc welder is provided with a gain compensating circuit by which the gain of the control circuit can be automatically varied depending upon the value of the welder output so that the hunting which may occur when the value of the welder ouput is low can be advantageously eliminated and concurrently the sensitivity can be improved even when the value of the welder output is high. Accordingly, reduction of the regution of the welder output and a favorable transient characteristic can be both ensured.

These and other objects and features of the present invention will become apparent from the following description taken in conjunction with preferred embodiments with reference to the accompanying drawings, wherein:

Before the description of the present invention proceeds, it is to be noted that like reference characters employed in FIG. 1 to FIG. 3 are also employed in FIG. 4 to FIG. 7 to designate like parts shown throughout the accompanying drawings. In addition, for the sake of brevity, the description which has been already made in connection with the like parts is hereinafter omitted.

Figure 4:
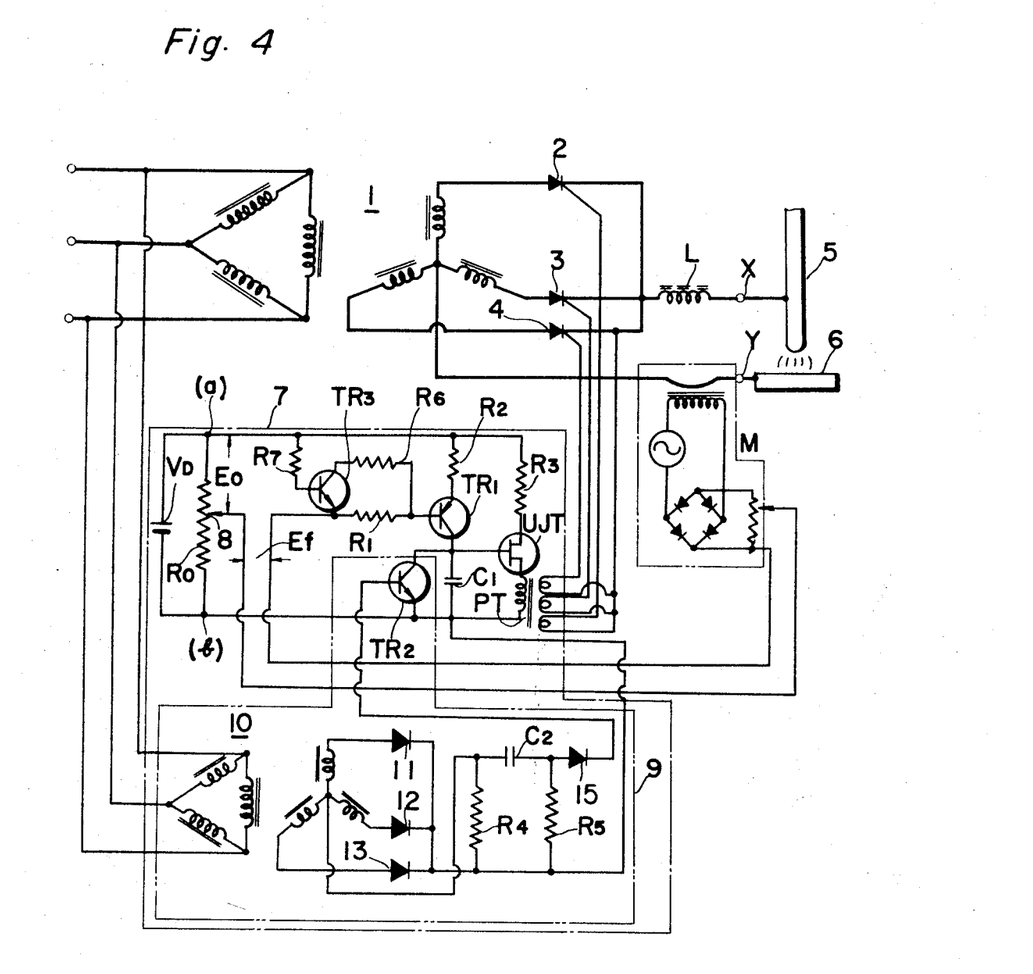
FIG. 4 is a circuit diagram of FIG. 2 in which one embodiment of the present invention is incorporated.

The DC arc welder of the present invention comprises the circuit arrangement shown in FIG. 2 to which the gain compensating circuit as will be mentioned later is additionally incorporated. The gain compensating circuit according to the present invention includes, as shown in FIG. 4, a resistor $R_6$ having one end connected with one end of the resistor $R_1$ which is in turn connected with the base of the transistor TR1, a NPN amplifier, Transistor TR3, the collector of which is connected with the other end of the resistor $R_6$ and the emitter of which is connected with the other end of the resistor $R_1$, and a resistor $R_7$ having one end connected with the base of said amplifier transistor TR3 and the other end connected with the positive terminal of the DC power source $V_D$.

While in the circuit arrangement, it has been well known that the rate of variation of the feed back voltage Ef relative to the welder output is, as compared with that of the preset voltage Eo relative thereto, so small that the difference Eo—Ef is proportional to the value of the welder output. Accordingly, it may be said that the difference Eo—Ef is small when the phase control angle $\alpha$ is large and the difference Eo—Ef is large when the phase control angle $\alpha$ is small.

In view of the foregoing, the value of the resistor $R_1$ should be selected so high that the gain of the control circuit will not become excessive and, accordingly, no hunting will occur even when the phase control angle $\alpha$ is of the larger value, that is, when the difference Eo—Ef is small. On the other hand, the value of the resistor $R_6$ should be selected so low that the gain of the control circuit will not be considerably lowered and, accordingly, the control sensitivity will not be adversely affected even when the phase control angle $\alpha$ is of the small value, that is, when the difference Eo—Ef is large.

In the case where the welding operation is performed with the use of the DC arc welder of the above circuit arrangement wherein, by positioning the slider 8, the value of the variable resistor Ro is adjusted to give the preset voltage Eo of a relatively lower value thereby to obtain the welder output of a relatively lower value while the phase control angle $\alpha$ is large, the value of current flowing to the base of the amplifier transistor TR3 through the resistor $R_7$ is low and, therefore, the collector current of the amplifier transistor TR3 flowing through the resistor $R_6$ is low. However, the base current of the amplifier transistor TR1 that has been supplied through the resistor $R_2$ is substantially equal to the sum of the collector current of the amplifier transistor TR3 that has been supplied through the resistor $R_6$ and the current flowing through the resistor $R_1$. In view of this fact, it will be clear that the base current of the transistor TR1 is affected by the value of the resistor $R_1$.

Accordingly, if the resistor $R_1$ is selected of a relatively higher value as hereinbefore described, the base current of the amplifier transistor TR1 can be maintained at a low value and, as a result thereof, the collector current of the amplifier resistor TR1 can also be maintained at a correspondingly low value.

Figure 5:
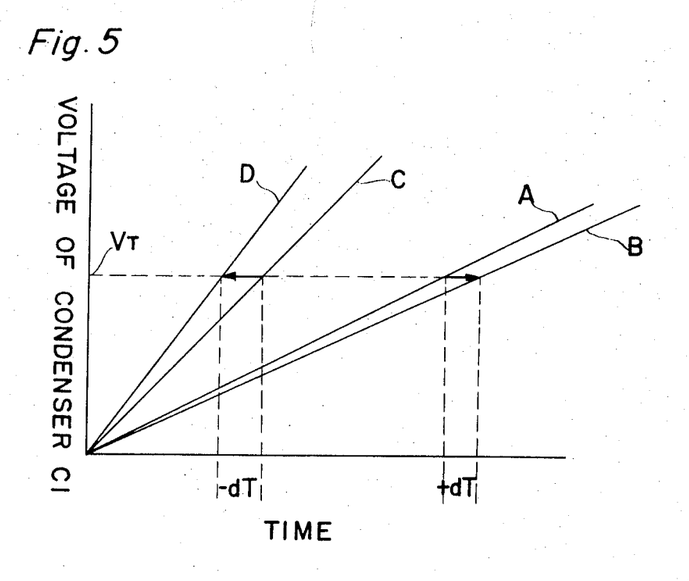
FIG. 5 is a graph showing a charging characteristic of the condensor $C_1$ which is obtainable when the gain compensating circuit according to the present invention is operated.

As the collector current of the amplifier transistor TR1 is reduced to the low value by the provision as hereinbefore described, the condensor $C_1$ can be charged substantially in such a manner as illustrated in the characteristic curve of FIG. 5, wherein the line A represents the behavior of voltage charged without the provision of the gain compensating circuit and the line B represents the behavior of voltage charged with the provision of the gain compensating circuit. From the characteristic curve of FIG. 5, it can be understood that the angle of inclination of the line B is smaller than that of the line A and this given an account that, by the provision of the gain compensating circuit according to the present invention, the time necessary for the voltage of the condensor $C_1$ to arrive at the trigger voltage of the uni-junction transistor UJT with respect to the difference voltage Eo—Ef can be increased by an increment dT as compared with that obtainable without the provision of the gain compensating circuit. This increment dT of time may be expressed in terms of phase angle $d\alpha$. Accordingly, the gain of the phase controlled rectifier circuitry which additionally includes the gain compensating circuit according to the present invention will be:

$$[\ \Delta E_D/(\Delta\alpha + d\alpha)\ ]\ \alpha=\alpha_1$$

if it is assumed that the gain of the phase controlled rectifier circuitry without the gain compensating circuit is $[\ \Delta E_D/\Delta\alpha\ ]\ \alpha=\alpha_1$. Thus, it will be clearly understood that the provision of the gain compensating circuit is effective to reduce the gain of the phase controlled rectifier circuitry to the optimum value which must be achieved to maintain the welder output at a constant value with respect to the preset voltage Eo. Nevertheless, the gain of the control circuit has been reduced under the condition that the phase control angle $\alpha$ is of the large value while the welder output is of the relatively lower value.

On the other hand, if the variable resistor Ro is adjusted by positioning the slider 8 to give the preset voltage Eo of a relatively higher value, to thereby enable the welding operation under the condition that the phase control angle $\alpha$ is of a relatively smaller value while the welder output is of a relatively higher value, the difference voltage Eo—Ef will become high and the base current of the amplifier transistor TR3 flowing through the resistor $R_7$ will correspondingly increase, resulting in that the collector current of said amplifier transistor TR3 flowing through the resistor $R_6$ increases. However, since the base current of the amplifier transistor TR1 that has been supplied through the resistor $R_2$ is substantially equal to the sum of the collector current of the amplifier transistor TR3 flowing through the resistor $R_6$ and the current flowing through the resistor $R_1$ as hereinbefore described, the base current of the amplifier transistor TR1 according to the present invention is higher than that in the circuit arrangement of FIG. 2 by the value of the collector current of the amplifier transistor TR3 flowing through the resistor $R_6$.

As the collector current of the transistor TR1 increases, the condensor $C_1$ can be charged substantially in such a manner as illustrated in the characteristic curve of FIG. 5, wherein the line C represents the behavior of voltage charged without the provision of the gain compensating circuit and the line D represents the behavior of voltage charged with the provision of the gain compensating circuit. This gives an account that, by the provision of the gain compensating circuit according to the present invention, the time necessary for the voltage of the condensor $C_1$ to arrive at the trigger voltage of the uni-junction transistor UJT with respect to the difference voltage Eo—Ef can be reduced by a decrement $-dT$ as compared with that obtainable without the provision of the gain compensating circuit. Accordingly, the gain of the phase controlled rectifier circuitry which additionally includes the gain compensating circuit according to the present invention will be:

$$[\ \Delta E_D/(\Delta\alpha - d\alpha)\ ]\ \alpha=\alpha_2$$

if the gain of the phase controlled rectifier circuitry without the gain compensating circuit is assumed the same as hereinbefore described. Thus, it will be clearly understood that the provision of the gain compensating circuit is effective to increase the gain of the phase controlled rectifier circuitry to the optimum value which must be achieved to maintain the welder output at a constant value with respect to the preset voltage Eo of the relatively higher voltage.

From the foregoing description, it has now become clear that the gain compensating circuit including the resistors $R_6$ and $R_7$ and the amplifier transistor TR3 is effective to automatically compensate the gain of the phase controlled rectifier circuitry in response to the welder output, without accompanying the disadvantages hereinbefore described as inherent to the conventional DC arc welder.

Figure 6:
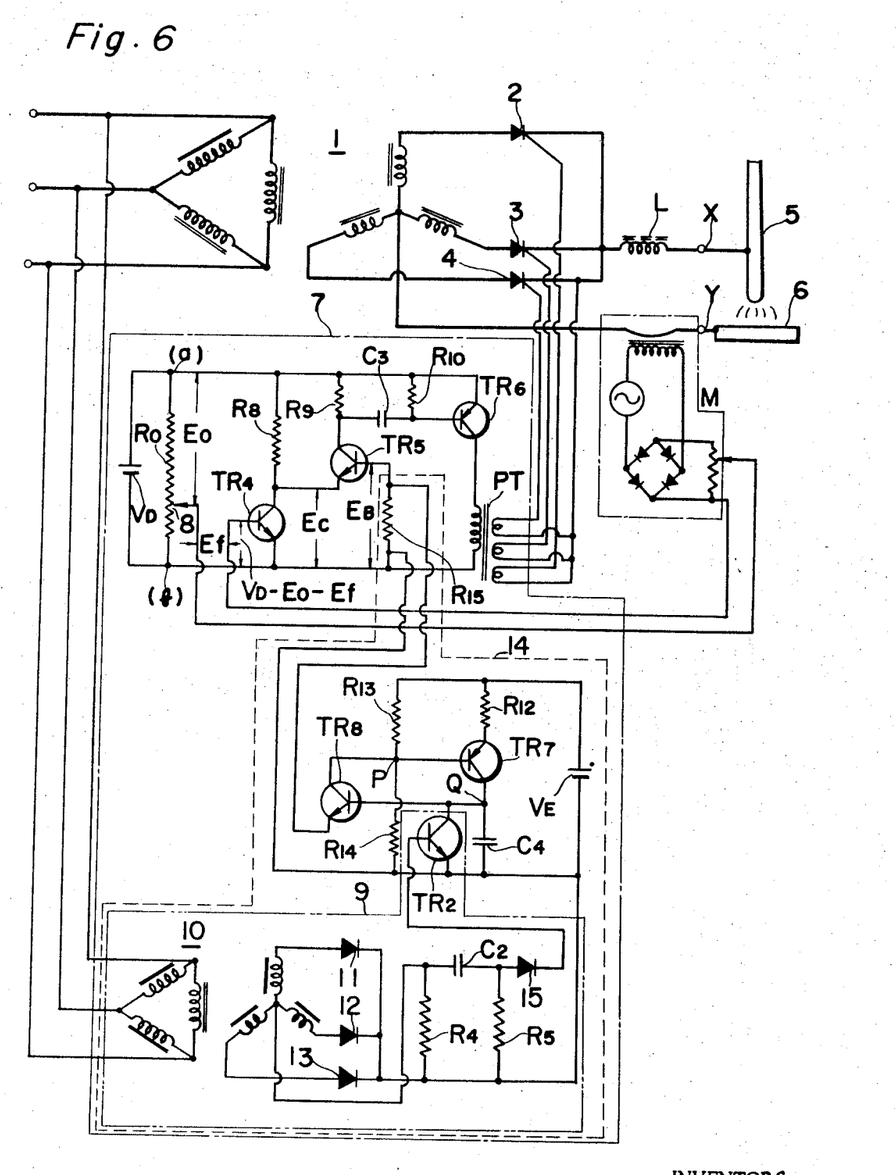
FIG. 6 is a circuit diagram of FIG. 2 in which another embodiment of the present invention is incorporated, and FIGS. 7 (A), (B) and (C) are schematic diagrams showing respective waveforms of voltage applied in a trigger circuit employed in the DC arc welder according to the present invention in FIG. 6.
Figure 7:
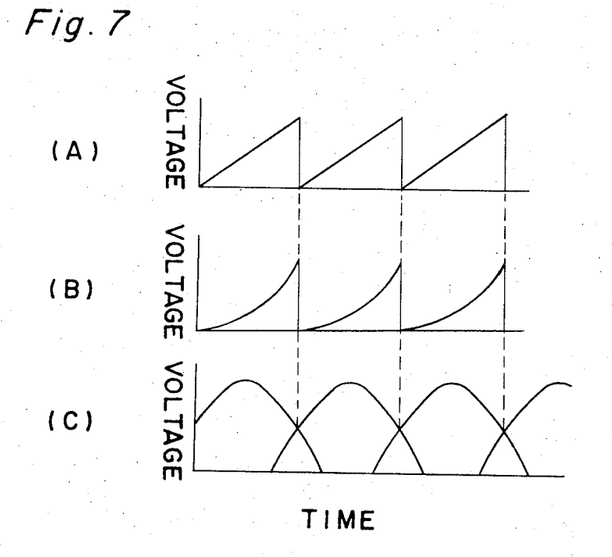

Referring now to FIGS. 6 and 7, the control signal generator comprises a triangular wave generator 14 of the circuit arrangement as will be mentioned later. In the circuit arrangement in FIG. 6, the DC power source has its positive terminal connected with the collector of a NPN transistor TR4 through a resistor $R_8$ and its negative terminal connected with the emitter of an amplifier transistor TR4. The variable resistor Ro is, of course, connected in parallel relation to said power source $V_D$. Also connected with the positive terminal of the power source $V_D$ through a resistor $R_9$ is the collector of a NPN switching transistor TR5, the base of which is connected with the negative terminal of said power source $V_D$ through the triangular wave generator 14. A switching transistor TR5 has its collector connected with the base of a PNP switching transistor TR6 through a condensor $C_3$, the emitter of said switching transistor TR6 being connected with the positive terminal of the power source $V_D$ while the collector thereof is connected with the negative terminal of the power source $V_D$ through the pulse transformer PT. A resistor $R_{10}$ is disposed between the base of the switching transistor TR6 and the positive terminal of the power source and, the collector of the amplifier transistor TR4 is connected with the emitter of the switching transistor TR5.

It is to be noted that the voltage Ef which is negatively fed back from the output terminal of the welder is adapted to be supplied between the slider 8 of the variable resistor Ro and the base of the amplifier transistor TR4 so that the difference voltage [ ($V_D$ − Eo) −Ef ] can appear between the base of the amplifier transistor TR4 and the negative terminal of the power source.

The triangular wave generator 14 comprises a first series circuit including a resistor $R_{12}$, a PNP amplifier transistor TR7 and a condensor $C_4$ and a second series circuit including resistors $R_{13}$ and $R_{14}$, all being connected in parallel relation to a DC power source $V_E$ as shown. The junction P between the resistors $R_{13}$ and $R_{14}$ is connected with the base of the amplifier transistor TR7. A third series circuit including an NPN amplifier transistor TR8 and a resistor $R_{15}$ is provided between the junction P and the negative terminal of the power source $V_D$ as shown. The junction Q between the amplifier transistor TR7 and the condensor $C_4$ is connected with the base of the amplifier transistor TR8. The synchronizing circuit 9 of the circuit arrangement shown in FIG. 2 is disposed between the junction Q and the negative terminal of the power source $V_D$.

It is to be noted that the resistor $R_{13}$ may be omitted depending upon one or more performance characteristics of such elements as amplifier transistors TR7 and TR8 and/or one or more values of such elements as resistors $R_{12}$ and $R_{14}$.

Each duration of the triangular waves is, as shown in FIG. 7(C), substantially equal to the interval between two intersection point of each phase voltage generated by the three phase AC transformer.

In the circuit arrangement as hereinbefore described, the preset phase control angle can be determined by the setting of the variable resistor Ro, namely, the voltage $V_D$−Eo. Accordingly, the circuit arrangement shown is such that, if the phase control angle is of a small value, the base current of the amplifier transistor TR4 has a tendency to increase in proportion to the difference voltage [ ($V_D$− Eo) −Ef ] so that the voltage Ec between the collector and emitter of the amplifier transistor TR4 can be lowered.

However, the output voltage of the triangular wave generator 14 appearing at the both ends of the resistor $R_{15}$ is adapted to be supplied to the base of the switching transistor TR5. Accordingly, when the output voltage of the triangular wave generator 14 increases over the collector-emitter voltage Ec of the amplifier transistor TR4, the switching transistor TR5 can be switched on to thereby permit the flow of the collector current of the switching transistor TR5 through the resistor $R_9$. Therefore, the voltage at the both ends of said resistor $R_9$ can be supplied to the switching transistor TR6 after it has been differentiated by a differentiation circuit which comprises the condensor $C_3$ and the resistor $R_{10}$.

As the voltage that has been differentiated by the differentiation circuit is applied to the switching transistor TR6, the latter can be switched on for a short period of time to permit the flow of current from the power source $V_D$ to the primary winding of the pulse transformer PT through the switching transistor TR6, whereby a triggering pulse for triggering the thyristors on can be produced from the secondary winding of the pulse transformer PT.

In view of the fact that the phase at which the triggering pulse is generated is, as hereinbefore described, determined by the output voltage of the triangular wave generator 14 exceeding over the collector-emitter voltage Ec of the amplifier transistor TR4, it can be said that the triggering pulse generating phase varies depending upon the value of the difference voltage [ ($V_D$ − Eo) −Ef ]. In other words, if the difference voltage is of a relatively higher value, the pulse generating phase can be accelerated with reduction of the phase control angle $\alpha$ to a relatively smaller value and, on the other hand, if the difference voltage is of a relatively lower value, the phase control angle $\alpha$ will increase to a relatively larger value to comply with the welder output of a relatively lower value.

In the circuit arrangement of the triangular wave generator 14, if the amplifier transistor TR8 is not provided as has been conventionally done, while the end of the resistor $R_{15}$ connected with the base of the switching transistor TR5 is directly connected with the junction Q to obtain the output voltage of waveform of FIG. 7 (A) from the generator 14, the ratio of the differential $\Delta\alpha$ of the phase control angle relative to the differential $\Delta$ [ ($V_D$ − Eo) −Ef ] of the difference voltage will be constant so that no gain of the control circuit can be compensated.

On the contrary, according to the present invention, by the provision of the amplifier transistor TR8, a portion of the voltage of the power source $V_E$ appearing at the both ends of the resistor $R_{13}$ is adapted to drive the amplifier transistor TR7 while the collector current of the amplifier transistor TR7 flowing through the resistor $R_{12}$ is adapted to charge the condensor $C_4$. The amplifier transistor TR8 can be driven by the voltage of the condensor $C_4$ and the collector current of the amplifier transistor TR8 flowing under the voltage between the both ends of the resistor $R_{14}$ is supplied to the resistor $R_{15}$ to produce the output voltage of the triangular waveform of FIG. 7 (B) from the generator circuit 14. Accordingly, as the condensor $C_4$ is charged, the output voltage appearing at the both ends of the resistor $R_{15}$ can be increased. Accordingly, the output voltage of the generator 14 appearing at the both ends of the resistor $R_{15}$ has the waveform such as shown in FIG. 7 (B) wherein a rise-up portion is somewhat inwardly recessed.

Since the output voltage of the triangular wave generator 14 is of substantially triangular waveform as hereinbefore described and shown in FIG. 7 (B), the ratio of the differential $\Delta\alpha$ of the phase control angle $\alpha$ relative to the differential $\Delta$ [($V_D$ −Eo) −Ef ] of the difference voltage has a tendency to increase with increase of the welder output wherein the phase control angle $\alpha$ is of a relatively smaller value.

In other words, the higher the welder output wherein the phase control angle $\alpha$ is of a relatively smaller value, the higher the gain of the control circuit becomes. Therefore, the provision of the transistor TR8 in the circuit arrangement shown in FIG. 6 acts as a gain compensating circuit by which the gain of the control circuit can be automatically compensated in proportion to the value of the welder output without accompanying the disadvantages hereinbefore described as inherent to the conventional DC arc welder. For example, in FIG. 6, although the circuit has been described as including a pair of separate power sources $V_D$ and $V_E$, either of the two may be employed without necessitating the other. In addition, instead of the output current of the welder which has been described as being fed-back, it is to be noted that the output voltage may be fed-back to obtain a constant voltage characteristic.

From the foregoing description it has now become clear that the present invention is effective to provide an improved DC arc welder wherein a stable control thereof can be advantageously effected.

Although the present invention has been fully described in conjunction with the preferred embodiments thereof with reference to the accompanying drawings, it is to be noted that various modification and change are apparent to those skilled in the art without departing from the true spirit and scope of the present invention, and accordingly, the present invention is not to be limited thereby, but should be construed as including such modification and change.

We claim:

1. In a direct current arc welder comprising a phase control circuit for controlling the triggering phase of at least one controlled rectifier element to convert alternating current into direct current which is in turn supplied to a welding electrode and a workpiece to be welded and a feed back circuit for negatively feeding a portion of the direct current output thus converted back to a control circuit for the phase controlled rectifier circuit to thereby control the welder output, the improvement which comprises a gain compensating circuit provided in said phase control circuit by which the gain of the control circuit can be compensated in response to the value of said direct current output of the welder to maintain the gain of said control circuit at a substantially constant value irrespective of variations in the value of said direct current output.

2. In a direct current arc welder comprising a phase a phase control circuit for controlling the triggering phase of at least one controlled rectifier element to convert an alternating current into direct current which is in turn supplied to a welding electrode and a workpiece to be welded and a feed back circuit for negatively feeding a portion of the direct current output thus converted back to the phase control circuit to thereby control the welder output, the improvement wherein said phase control circuit includes an output preset circuit of the welder, a control signal generator circuit and a gain compensating circuit, the output of said preset circuit being adapted to be compared with a negatively feed back signal fed from said feed back circuit to provide a signal representative of the difference therebetween which is in turn supplied to said control signal generator circuit through said gain compensating circuit.

3. A direct current arc welder as claimed in claim 2, wherein said phase control circuit comprises a first series circuit including a pulse transformer, a uni-junction transistor and a resistor and a second series circuit including a condensor disposed in parallel to a synchronizing circuit and having one end connected with the emitter of said uni-junction transistor, an amplifier transistor and a resistor, said preset circuit including a variable resistor connected in parallel to a DC power source and said gain compensating circuit including a first resistor, a amplifier transistor and a second resistor, said first resistor and amplifier transistor of said gain compensating circuit being connected in series with each other and connected in parallel to a resistor having one end connected with the base of the amplifier transistor of said second series circuit while the base of said amplifier transistor of said gain compensating circuit connected with the positive terminal of said DC power source through said second resistor, whereby the voltage of the feed back signal is supplied between a slider of said variable resistor and said resistor connected with the base of said amplifier transistor.

4. In a direct current arc welder comprising a phase control circuit for controlling the triggering phase of at least one controlled rectifier element to convert alternating current into direct current which is, in turn, supplied to a welding electrode and a workpiece to be welded and a feed back circuit for negatively feeding a portion of the direct current thus converted back to the phase control circuit thereby to control the welder output, the improvement wherein said phase control circuit includes an output preset circuit, a comparision circuit for comparing the output from said preset circuit with the negative feed-back signal to provide a signal representative of the difference therebetween, a triangular wave generator circuit including a gain compensating circuit and a control signal generator circuit whereby, only when the output of said triangular wave generator circuit exceeds the value of said signal representative of the difference therebetween, a signal can be supplied to said control signal generator circuit.

5. A direct current arc welder as claimed in claim 4, wherein said control output preset circuit includes a DC power source of constant voltage and a variable register connected in parallel to said power source, said comparision circuit having a resistor and an amplifier transistor for comparing the output from said preset circuit with the negative-feed back signal, said control signal generator circuit including a series circuit having a pulse transformer and a switching transistor disposed between the positive and negative terminals of said power source, a resistor connected with a combination of a resistor and a condensor connected between the emitter and base of said switching transistor of said series circuit and a switching transistor disposed between a junction between said condensor and a resistor and said comparison circuit, said triangular wave generator circuit including the gain compensating circuit, said triangular wave generator circuit consisting of a resistor connected between the base of said switching transistor of said control signal generator circuit and the negative terminal of said power source, a series circuit including a condensor connected in parallel to a synchronizing circuit and an amplifier transistor the base of which is connected with the negative terminal of said power source through a resistor, and a resistor, and an amplifier transistor of said series circuit and one end of said resistor, the base of which is connected with said condensor.

6. A direct current arc welder according to claim 4, wherein said phase control output preset circuit includes a first DC power source and a variable resistor connected in parallel with said power source, said comparison circuit for comparing the output of said preset circuit with said negative feed back signal including a first resistor and a first amplifier transistor connected together in parallel with said variable resistor, and said control signal generator circuit having a pulse transformer and a first switching transistor connected in series between the positive and negative terminals of said first power source.

7. A welder according to claim 6, wherein said control signal generator circuit further includes a second resistor connected between the base and emitter of said first switching transistor, a series circuit of a resistor and a capacitor including a first capacitor and a third resistor connected across said second resistor and further including a second switching transistor connected between the junction of said first capacitor and said third resistor and said first amplifier transistor of said comparision circuit.

8. A welder according to claim 7, wherein said triangular wave generating circuit includes said gain comparison circuit, said triangular wave generating circuit having a fourth resistor connected between the base of said second switching transistor and one terminal of said first DC power source, a second amplifier transistor and a fifth resistor, one end of which is connected to one electrode of said second amplifier transistor, connected across said fourth resistor, and a synchronizing circuit for said alternating current, including a third amplifier transistor, the emitter and collector electrodes of which are connected between the base electrode of said second amplifying transistor and one end of said fifth resistor.

9. A welder according to claim 7, wherein said triangular wave generating circuit further includes a fourth amplifier transistor and a second capacitor connected in series and being resistively coupled to a second D.C. power source, the junction of said second capacitor and said fourth amplifying transistor being connected to the base of said second amplifying transistor.

* * * * *